United States Patent
Kreutzfeldt et al.

(10) Patent No.: US 10,907,616 B2
(45) Date of Patent: Feb. 2, 2021

(54) STATUS MONITORING FOR MECHANICAL PLANTS, IN PARTICULAR WIND TURBINES

(71) Applicant: VESTAS WIND SYSTEMS A/S, Aarhus (DK)

(72) Inventors: Jannes Kreutzfeldt, Hamburg (DK); Matthias Schulz, Hamburg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 200 days.

(21) Appl. No.: 16/098,434

(22) PCT Filed: May 2, 2017

(86) PCT No.: PCT/EP2017/060437
§ 371 (c)(1),
(2) Date: Nov. 1, 2018

(87) PCT Pub. No.: WO2017/191142
PCT Pub. Date: Nov. 9, 2017

(65) Prior Publication Data
US 2019/0145382 A1    May 16, 2019

(30) Foreign Application Priority Data

May 3, 2016  (DE) ......... 10 2016 207 609

(51) Int. Cl.
*F03D 17/00*        (2016.01)
(52) U.S. Cl.
CPC ........ *F03D 17/00* (2016.05); *F05B 2270/303* (2013.01); *F05B 2270/3032* (2013.01); *Y02E 10/72* (2013.01)
(58) Field of Classification Search
CPC ........ F03D 17/00; F03D 7/042; F03D 7/0296; F03D 7/0292; F05B 2270/303;
(Continued)

(56) References Cited

U.S. PATENT DOCUMENTS 8,112,239 B2 * 2/2012 Elisiussen ............... F03D 80/50
                                                        702/113
9,645,046 B2 * 5/2017 Zhang .................... G01M 13/00
(Continued)

FOREIGN PATENT DOCUMENTS

CN   102341597 A    2/2012
DE   102014005090 A1   10/2015
(Continued)

OTHER PUBLICATIONS

Chinese Office Action for Application No. 201760040028.X dated Dec. 16, 2019.
(Continued)

*Primary Examiner* — Freddie Kirkland, III
(74) *Attorney, Agent, or Firm* — Patterson + Sheridan, LLP (57) ABSTRACT

The invention relates to a method for monitoring a status of at least one component of a mechanical plant, in particular of a wind turbine, that comprises the following steps: (i) receiving an evaluation signal that is formed based on values of a measurement quantity recorded in the plant, (ii) determining at least one parameter data set on the basis of the evaluation signal as a function of a signal that is representative for a stress of the plant and/or based on a spectral analysis of the evaluation signal, (iii) evaluation of an indicator signal as a function of at least one parameter data set and determining the status of the component of the plant as a function of the indicator signal.

20 Claims, 5 Drawing Sheets

(58) Field of Classification Search
CPC ........... F05B 2270/3032; Y02E 10/726; G01H 1/003; G01H 1/00; G01M 13/00
See application file for complete search history.

(56) References Cited

U.S. PATENT DOCUMENTS

| | | | |
|---|---|---|---|
| 10,288,043 B2* | 5/2019 | Yu | F03D 17/00 |
| 10,385,853 B2* | 8/2019 | Araki | G01H 1/003 |
| 2006/0113801 A1 | 6/2006 | Schubert et al. | |
| 2009/0110540 A1* | 4/2009 | Bywaters | F03D 7/0296 415/47 |
| 2010/0138267 A1 | 6/2010 | Vittal et al. | |
| 2011/0018727 A1 | 1/2011 | Bharadwaj et al. | |
| 2012/0204646 A1* | 8/2012 | Lee | G01M 7/00 73/594 |
| 2012/0323543 A1* | 12/2012 | Frederiksen | G05B 23/0254 703/7 |
| 2014/0172326 A1* | 6/2014 | Zhang | G01R 31/343 702/38 |
| 2016/0341598 A1* | 11/2016 | Van Baren | G01H 3/10 |
| 2020/0141391 A1* | 5/2020 | Anta Martinez | F03D 17/00 |

FOREIGN PATENT DOCUMENTS

| | | |
|---|---|---|
| EP | 1930855 A2 | 6/2008 |
| EP | 2476901 A1 | 7/2012 |
| EP | 2746885 A1 | 6/2014 |
| WO | 2009076955 A1 | 6/2009 |
| WO | 2010069318 A1 | 6/2010 |
| WO | 2017191142 A1 | 11/2017 |

OTHER PUBLICATIONS

PCT International Search Report and Written Opinion for PCT/EP20171060437 dated Jul. 8, 2017.

Peng Guo et al: "Wind Turbine Gearbox Condition Monitoring with AAKR and Moving Window Statistic Methods," Energies, vol. 4, No. 12, Nov. 23, 2011. pp. 2077-2093.

Yong Long Yan et al: "Condition Parameter Modeling for Anomaly Detection in Wind Turbines," Energies, vol. 7, No. 5, May 6, 2014, pp. 3104-3120.

Wei Qiao et al: "University of Nebraska—A Survery on Wind Turbine Condition Monitoring and Fault Diagnosis—Part II: Signals and Signal Procesing Methods", Faculty Publications from the Department of Electrical and Computer Engineering. Paper 304, Jan. 1, 2015.

Peng Guo et al: "Wind Turbine Generator Condition-Monitoring Using Temperature Trend Analysis", IEEE Transactions on Sustainable Energy, IEEE, USA, vol. 3, No. I, Jan. 1, 2012 (Jan. 1, 2012), pp. 124-133.

German Search Report and Exam Report for DE102016207609.4 dated Jan. 23, 2017.

* cited by examiner

STATUS MONITORING FOR MECHANICAL PLANTS, IN PARTICULAR WIND TURBINES

The present invention is about status monitoring of a mechanical plant. In particular, the invention relates to a method and an installation for monitoring the status of at least one component of a mechanical plant. The mechanical plant can in particular be a wind turbine.

Wind turbines and other mechanical plants are already equipped with a series of sensors for operational monitoring devices such as temperature sensors to record the temperature of bearings. The measurement data of said sensors are used by the plant control system for controlling of the plant. Further, the measurement data can be used by the plant control system and/or in a monitoring center for detecting acute failures or malfunctions of bearings or other components of the plant.

In case of such acute failures, the plant can usually only be operated further after repair, and there are often longer undesired downtimes of the plant until such a repair is performed. In addition, the failure of one component can lead to consequential damages of further components of the plant that will also have to be repaired and/or replaced for restarting the operation of the plant.

It is therefore desirable to avoid failures of components of a mechanical plant. In this context, failure of a component is usually the consequence of a damage that has existed on the component for a longer time. If such a damage is detected early, timely maintenance of the plant can be performed in the process of which the component in question can be repaired or replaced prior to failure. Longer downtimes of the plant or consequential damages of other components can therefore be prevented.

Known methods for early detection of damages on components of mechanical plants, in particular of plants with rotating elements, comprise inter alia the evaluation of vibration measurements that are performed by means of acceleration sensors. This process includes the verification whether oscillations with known critical frequencies, which are characteristic for damages, exist with a high amplitude. Further known methods comprise the examination of oil samples and endoscopic examinations. But to the same extent as the vibration examinations, these methods have the disadvantage of being very work-intensive. This means that the methods require a sophisticated additional sensor system.

In addition, the methods can often be performed only manually by a technician at the facilities.

The purpose of the present invention therefore is to enable an easier early detection of damages on components of a mechanical plant.

According to an aspect of the invention, the problem is solved by a method for monitoring of a status of at least one component of a mechanical plant, in particular of a wind turbine, which comprises the following steps: (i) receiving an evaluation signal that is formed based on values of a measurement quantity recorded in the plant, (ii) establishing of at least one parameter data set on the basis of the evaluation signal as a function of a signal that is representative for a stress of the plant or on the basis of a spectral analysis of the evaluation signal, (iii) determining an indicator signal as a function of the at least one parameter data set and determining the status of the component of the plant as a function of the indicator signal, wherein the status determination is performed independently of vibration frequencies of a rotating components and/or of its bearings that are induced by a damage.

The determination of at least one parameter data set as a function of the signal that is representative for the stress of the plant enables the obtention of data from the evaluation signal based on which a damage (i.e. a defect and/or wear) of the components can be detected prior to failure of the component. In particular, relevant parameter data sets for mechanical plants, whose stress varies due to external influences (in case of a wind turbine, said external influences comprise in particular the wind conditions to which the wind turbine is exposed) can be determined in this way. The varying stress levels of the plant usually lead to fluctuations of the measurement quantities that are recorded in the plant and that are independent of damages of a component. Through the determination of the parameter data sets to be evaluated based on the signal that is representative for the stress of the plant, said fluctuations can be masked to a large extent. The evaluation can therefore be performed for such parameter values determined based on the evaluation signals that have a higher significance with regard to damages to be identified. Thus, the early detection of damages is improved and/or enabled in the first place.

Surprisingly, a similar advantage can be achieved in the process of establishing the at least single parameter data set based on a spectral analysis. In this respect, it is assumed that the evaluation signal and/or the measurement quantity reacts more strongly (increases or decreases more strongly) to specific external influence conditions in case of a faulty component than in case of an intact component. These influence conditions often repeat themselves regularly with a specific frequency so that, in case of a faulty component, larger amplitudes occur for this frequency in the spectrum of the evaluation signal, which are an indicator for the damage. It can consequently be detected by means of the spectral analysis whether the component reacts in a special way to the events in question that occur with the relevant frequencies and whether it is faulty or not.

The damage detection according to the invention therefore differs in particular from methods in which damages of rotating plant components or their bearings are detected on the basis of vibration measurements when known damage frequencies have a large amplitude. This is because the frequencies in this context are frequencies that are induced in case a damage exists due to the structural design of a component and not the frequencies of external influences. On their bases, damages can be detected without knowledge of component-specific properties.

In this respect, it is in particular also provided that the determination of the status of the component is performed independently of vibration frequencies of a rotating components and/or of its bearings that are induced by a damage. Said frequencies shall be understood in particular as frequencies of positioning variants of rotating components and/or their bearings, which can be determined based on position or acceleration data of such plant elements. Although such vibrations can also manifest themselves in the measurement data evaluated according to the invention, they are not evaluated for the status determination. In an embodiment of the invention, it is provided in addition that the measurement quantity is not representative for vibrations of a rotating component and/or its bearings, An embodiment of the invention provides that, based on the spectral analysis, amplitudes for spectral portions with regard to multiple temporal phases of the evaluation signal are determined and that at least one parameter data set is formed on the basis of the established amplitudes. In a related embodiment, the indicator signal indicates values of amplitudes of a spectral portion with regard to the multiple temporal phases. The spectral analysis can in particular comprise Fourier transformations that are performed respectively for one of the temporal phases of the evaluation signal. Likewise, the spectral analysis can comprise a wavelet analysis, wherein wavelets with a temporal locality, which corresponds to respectively one temporal phase of the evaluation signal, can be used.

In a further embodiment of the invention, the at least one parameter data set is determined as a function of values of the evaluation signal that are selected out of the evaluation signal as a function of the signal that is representative for the stress of the plant.

Hence, the at least one parameter data set can also include values that are derived from selected values of the evaluation signal (in at least one computing step). A further embodiment of the invention provides that the at least one parameter data set includes values that are selected out of the evaluation signal as a function of the signal that is representative for the stress of the plant. In this variant, a direct adoption of the values of the evaluation signals for the parameter data set is provided.

An embodiment of the invention further provides that one or multiple parameter data sets are formed, of which each contains temporal mean values of values of the evaluation signals that are determined in connection with values of the signal that is representative for the stress of the plant within a predetermined value interval. In a related variant of the invention, the indicator signal is representative for a spread between temporal mean values of different parameter data sets and/or for the temporal mean values of a parameter data set. These embodiments are based on the observation that the spread between the mean values of parameter data sets, which have been formed this way, changes (in particular increases) while a damage occurs, and on the observation that the mean values change by themselves in a parameter data set, which has been formed this way, while a damage occurs.

The signal that is representative for the stress of the plant can in particular indicate a power produced by the plant. In the embodiments mentioned before, predetermined value intervals of this signal correspond in this case to predetermined power classes. The parameter data sets consequently include mean values of values of the evaluation signal that are each determined in connection with the operation of the plant in a specific power class.

In a further embodiment of the invention, it is provided that at least one parameter data set is formed, which contains values of the evaluation signals that are determined in connection with values of the signal that is representative for the stress of the plant within a predetermined value interval, and that the indicator signal is representative for a spread of the values included in the parameter data set in successive time intervals. The embodiment is based on the finding that also the spread of values of the evaluation signals, which are determined in connection with values of the signal that is representative for the stress of the plant and that are within a predetermined value interval, can be an indicator for the existence of a damage.

An embodiment of the invention further provides that at least one parameter data set is formed, which includes differences between values of the evaluation signal that are determined in connection with a transition of the signal that is representative for the stress of the plant from a first to a second value interval, and wherein the indicator signal indicates the values of the differences. This embodiment uses the observation that the evaluation signal often changes more strongly in case of a change of the stress than in case of an intact component.

In a further embodiment of the invention, at least one parameter data set is formed, which includes values of the evaluation signal that are determined in connection with temporal phases of the signal that is representative for the stress of the plant in which the courses of this signal are similar to one another. Thus, the temporal course of the stress can be taken into account besides the current stress that is related to a value of the evaluation signal. It was observed that this often has an influence on the course of the evaluation signal as well. This undesired influence with regard to the detection of damages can be reduced through the formation of one or multiple parameter data sets based on values of the evaluation signal, which are determined in connection with sections of the signal that is representative for the stress of the plant that have a similar temporal course. The similarity of the signal courses can be determined in this embodiment in particular by using an appropriate similarity measure, wherein a similarity can be detected if the similarity measure is smaller than a predetermined threshold value.

In a related embodiment of the invention, the indicator signal is representative for the values and/or changes of the values of the evaluation signal within temporal phases of the evaluation signal that correspond to the temporal phases of the signal that is representative for the stress of the plant in which the courses of this signal are similar to one another. This is based on the finding that the values of the evaluation signal often change significantly within the previously explained parameter data sets as well as their variations (as a function of the signal that is representative for the stress of the plant) while a damage of a component occurs.

The evaluation signal can include the measurement values that are recorded in the plant for the measurement quantity or be derived from these measurement values. In particular, the evaluation signal can contain mean values of measurement values that are calculated respectively for successive time intervals. This is particularly advantageous in cases where the received evaluation signal is previously transmitted by means of remote data transmission or in a similar way as the data volume to be transmitted can be reduced through the transmission of mean values instead of the measurement values. In addition or alternatively, the evaluation signal can be derived from the measurement values in a different way. For example, the evaluation signal can include differences of the measurement values and further values. Thus, the evaluation signal can include for example a difference between the temperatures of the component and the ambient temperature in case of temperature measurement values to be evaluated in order to mask the influence of the ambient temperature (that is in particular dependent on the time of the year and of the day).

The measurement quantity can in particular be a temperature. This measurement quantity is in particular suitable for an evaluation with regard to the early detection of damages in bearings for rotating machine elements or components that include such bearings because bearing damages change (usually increase) the generation of friction heat. But also other measurement values can be used for the evaluation.

It can further be provided that a damage indication of the component is detected based on the indicator signal when the indicator signal reaches a predetermined threshold value. This threshold value can be predetermined as an absolute value or as a relative value with regard to a value of the indicator signal that is determined for a specific point in time and/or for specific conditions such as the use of a completely intact component.

According to a further aspect, the invention suggests a computer program that comprises a program code that prompts a computer system to implement a method according to one of the Patent Claims 1-13 when the computer program is run on the computer system.

In addition, the invention suggests according to a further aspect a monitoring device for monitoring a status of at least one component of a mechanical device, in particular a wind turbine, wherein the monitoring device is designed in a way (i) to receive an evaluation signal that is formed based on values of a measurement quantity that is recorded in the plant, (ii) to determine at least one parameter data set on the basis of the evaluation signal as a function of a signal that is representative for a stress of the plant and/or based on a spectral analysis of the evaluation signal, (iii) to establish an indicator signal as a function of the at least one parameter data set and to determine the status of the component of the plant as a function of the indicator signal, wherein the status determination is performed independently of vibration frequencies of a rotating component and/or of its bearings induced by a damage.

The computer program according to claim 14, the monitoring device according to claim 15 and the method according to claim 1 have similar and/or identical embodiments that are indicated in particular in the dependent claims. In addition, also combinations of the variants indicated above and in the sub-claims represent embodiments of the invention.

This and further particularities of the invention also become clear based on the following description of embodiments of the invention based on the Figures. The Figures show.

In the following, embodiments of the invention will be explained especially with regard to the detection of faulty components of a wind turbine 1. However, also faulty components of other mechanical plants can be detected in a similar way.

Figure 1:
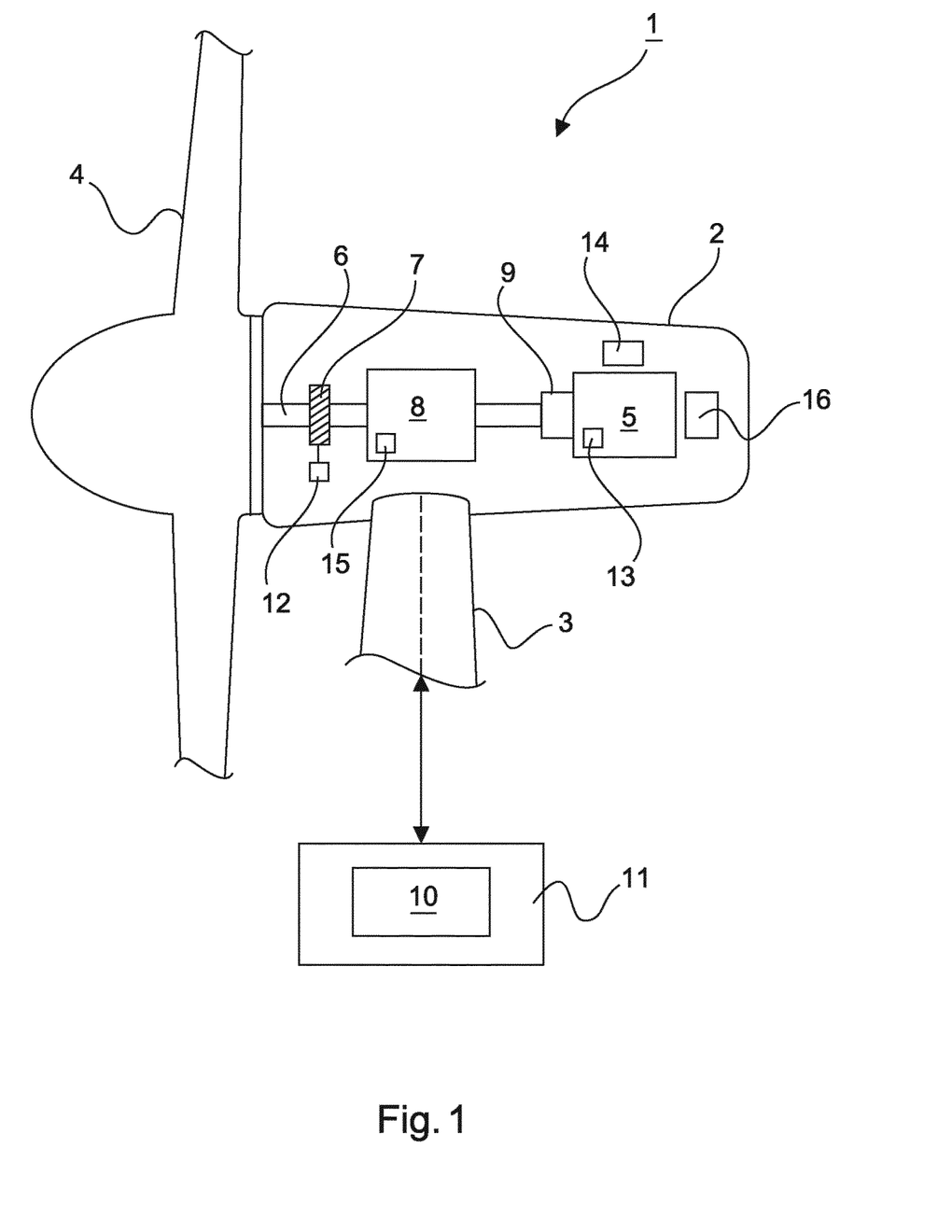
FIG. 1 an exemplary and schematic display of components of a wind turbine.

FIG. 1 shows components of a wind turbine 1 for generating electric power based on wind with a nacelle 2 that is installed on a tower 3. A rotor 4, which can comprise for example two or three rotor blades 5, is disposed on the nacelle 2. The rotor 4, that is also referred to as aerodynamic rotor, is set to a rotary movement by the wind during operation and therefore drives a generator 5 in the nacelle 2. As a consequence, the generator 5 generates the electric power provided by the wind turbine, which—after a transformation of the output signal of the generator 5 that is provided where required—can for example be fed into a power grid. The setting angle of the rotor blades in relation to the wind, which is also referred to as pitch, can be changed by the plant control system, in particular to set the speed and/or the angular momentum of the rotor 4 for different wind conditions respectively to a desired value.

The rotor 2 can be installed on a main shaft 6 that is supported by bearings 7, which are also referred to as main bearings herein and that can be formed for example as spherical roller bearings, within the nacelle 2. The main shaft 2 is optionally connected to a gearbox 8 that is coupled with the generator 5 via a coupling 9. The gearbox 8 translates the speed of the rotor 4 into a higher speed by means of which the generator 5 is driven. Likewise, the generator 8 can also be driven directly, i.e. without translation by the gearbox 8.

The wind turbine 1 further has a series of sensors for recording measurement signals within the wind turbine 1. The measurement signals are evaluated inter alia by a plant control system (not shown in the Figures) that controls the operation of the wind turbine 1 as a function of the measurement signals in a way that is in principle known to specialists. As explained in even greater detail in the following, measurement signals are in addition evaluated to monitor the status of one or multiple components. The evaluation can be performed by a monitoring device 10 that is disposed in the wind turbine. Likewise, the monitoring device 10 can be disposed at a distance from the wind turbine 1 in a monitoring center 11 that can be connected to multiple wind turbines. In this case, the measurement signals are transmitted via remote data transmission from the wind turbine 1 to the monitoring center 11 and forwarded to the monitoring device 10 from there.

The monitoring device 10 is preferably designed as a computer system that runs a software that provides the functionalities for implementing the evaluation of the measurement signals. In case of an automatically detected damage of a component of the wind turbine 1, the computer system emits in particular a relevant message. Likewise, measurement data as well as associated parameter data and indicator signals can be displayed and evaluated by an operator of the monitoring device 10 in order to detect damages. On the basis of this message, for example repair and/or replacement of the faulty component can then be prompted and performed.

The sensor system of the wind turbine 1 comprises multiple sensors that record the operating data of individual components of the wind turbine 1 that are influenced by the status of the components. These sensors are also referred to as component sensors in the following. The operating data recorded with the component sensors are evaluated by the monitoring device 10 in order to detect damages of the respective components. In this context, the operating data are preferably chosen in a way that they can be assigned to individual components of the wind turbine 1 and that they are not or hardly influenced by the status of other components. Examples for such operating data comprise temperature data for individual components. In the same way, however, other operating data can be evaluated as well. The evaluation of the measurement signals of the component sensors is performed in the monitoring device 10 for one or multiple component sensors, where required in consideration of further data recorded in the wind turbine. In case of the evaluation of the signals of multiple component sensors, the evaluation thereby occurs separately for each measurement signal in order to detect respective damages on the components of the wind turbine 1 to which the signal relates.

In the following, reference is made in an exemplary way and especially to temperature data that are recorded by temperature sensors of the wind turbine 1. In this context, a first temperature sensor 12 can be provided that measures the temperature of the main bearing 7 and whose measurement signal enables the detection of damages of the main bearing. A further temperature sensor 13 can be provided for recording the temperature of the bearings of the generator 5, wherein damages of the generator bearing can be detected based on the measurement signal of the temperature sensor. Besides, the generator can be cooled by means of a heat exchanger that transmits the thermal energy created by the generator 5 to an air current that is discharged from the nacelle 2 by means of a blower. A further temperature sensor 14 can be provided in this context for measuring the temperature of the air current within the heat exchanger or on the discharge side of the heat exchanger. Damages of the generator can be detected through an evaluation of the signals of the temperature sensor. Moreover, a temperature sensor 15, which records the temperature of the gearbox lubricant in the lubricant sump and whose measurement signal enables the detection of damages of the gearbox, can be provided.

The temperature sensors mentioned before will also be referred to as component temperature sensors in the following. In addition, the wind turbine preferably has a further temperature sensor 17 that records the ambient temperature inside the nacelle that will also be referred to as nacelle temperature in the following. The nacelle temperature is thereby recorded at a suitable place that is sufficiently distant from components of the wind turbine 1 that heat up. For the evaluation of the measurement data of the component temperature sensors, the monitoring device 10 can respectively form the difference between the temperature signal of the component temperature sensor and the nacelle temperature signal, which will also be referred to as adjusted temperature signal in the following. Through formation of the difference, temperature changes as a consequence of a varying ambient temperature of the nacelle (which can for example differ strongly in summer and winter) can be compensated as the ambient temperature usually influences the nacelle temperature and the temperature of the component to the same extent.

Furthermore, at least one stress signal, which is representative for the stress of the wind turbine 1 and that can be used for the evaluation of the measurement data of the component sensors, is provided by the wind turbine 1 in one variant. The stress of the wind turbine varies above all as a function of the wind conditions, wherein the wind turbine 1 and its components are exposed to a higher stress in case of higher wind velocities than in case of lower wind velocities. Accordingly, the stress signal can be adapted to the velocity of the wind that arrives at the rotor. Due to swirls and shadings by the rotor, however, this velocity does usually not correspond to the wind velocity in the area of the nacelle and is therefore recorded preferably ahead of the rotor (in the wind direction) by a suitable sensor. Such wind measurements are relatively work-intensive. It can therefore be preferable to determine another stress signal. In particular, the electric power created by the generator can be determined relatively easily, for example by means of a power and voltage measurement at the output of the generator, and used as a stress signal. The generated power is also representative for the stress of the wind turbine 1 as the generator produces a higher input power in case of higher wind velocities (and accordingly a higher stress of the wind turbine 1). A further example for a stress signal is the rotary power of the rotor and/or of the main shaft that can be determined out of the generated angular momentum and the speed.

The measurement and other data signals, which are used in the monitoring device 10 for damage detection, are, as explained, transmitted by the wind turbine, in particular for example by the plant control system, to the monitoring device 10 via a local connection (in case the monitoring device is integrated in the wind turbine) or via remote data transmission. In particular in case of a transmission via remote data transmission, it can thereby be provided for reduction of the data volume to be transmitted, to form mean values of the measurement signals for successive time intervals in the wind turbine 1 and to only transmit these mean values to the monitoring center 11 and/or the monitoring device 10. The time intervals have for example a duration of several seconds or several minutes, in particular 10 minutes, as usual for conventional wind turbines 1. In the monitoring device 10, the evaluation of these optionally calculated mean values and the evaluation of the input data takes place in an analogous way. Therefore, no distinction will be made between these two cases in the following.

The transmission of the different data signals takes place by indicating the point in time and/or the period of recording of the values, or the transmission essentially takes place in real time (i.e. without longer delays after determination of the values of the data signals) so that the monitoring device can respectively assign to the data values the point in time and/or period of their recording. Based on the time information, the monitoring device 10 is in particular enabled to determine the temporal course of the data signals. In addition, the monitoring device 10 can determine, based on the time information, values of different data signals that are associated to one another, i.e. values that have essentially been recorded at the same time or that relate essentially to the same time interval of the previously explained mean value formation.

In an embodiment of the monitoring device 10, the evaluation of the measurement signal of a component sensor is performed as a function of the stress signal. In this process, one or multiple parameter data sets are formed whose values are each determined based on specific values of the measurement signal that are selected based on the stress signal. For this selection, one or multiple methods can be used of which some will be explained in an exemplary way in the following. The further evaluation then takes place on the basis of the parameter data sets, wherein indicator signals are determined for the parameter data sets as a function of which the status of the component in question is determined by the monitoring device. Exemplary indicator signals indicate the temporal course of the values of the measurement signal within a specific parameter data set, the spread of values within a parameter data set, the spread of values of different parameter data sets that are associated to one another and the upward slope of a trend curve of the measurement signal. The indicator signals can in particular be compared to predetermined threshold values and the monitoring device 10 can determine the state of the respective component of the wind turbine as a function of the result of said comparison. In particular, the monitoring device 10 can detect a damage indication for the component in question if the indicator signal exceeds or underscores the associated threshold value (once). To avoid incorrect detection of damages due to potential "outliers", it can, however, also be provided for the monitoring device 10 to detect a damage indication when the indicator signal has exceeded the threshold value within a random or predetermined period multiple times in a predetermined number of cases.

In an implementation, the monitoring device 10 identifies a damage during detection of a damage indication based on an indicator signal and reports said damage. However, multiple indicator signals for parameter data sets, which are formed based on the same method, and/or for different groups of parameter data sets, which are formed based on different methods, can usually be determined for the measurement values recorded by a component sensor. In this case, the monitoring device 10 preferably performs at first a detection of damage indications based on several indicator signals in the way described above. Then, the results determined based on the individual indicator signals are put together and an existing damage is identified, as a function of these results according to a predetermined criterion, and reported by the monitoring device 10. It can for example be provided in this context that the monitoring device only reports a damage in cases where damage indications have been identified based on a predetermined number of indicator signals. Likewise, other criteria can be predetermined as well. The respective parameter data sets and indicator signals to be formed are preferably predetermined separately for the individual monitored components of the wind turbine 1. The selection of the parameter data sets and indicator signals to be formed can thereby be performed based on empiric examinations that can be used to determine which parameter data sets and indicator signals are particularly suitable, i.e. supply reliable detection results, for the detection of damages of a specific component.

The formation of the parameter data sets based on the stress signal especially takes place with regard to the condition that "natural" fluctuations of the measurement signals of the component sensors, which are independent of damages of the components, occur due to varying stresses of the components of the wind turbine that arise as a consequence of changing wind conditions. Hence and due to the higher stress of the components in case of higher wind velocities, also a higher temperature of the components can be expected in case of said wind velocities. Therefore, it is possible through an appropriate determination of the parameter data sets based on the stress signal to mask the "natural" fluctuations of the measurement signals, which result from a changing stress as a consequence of changing wind conditions, to a large extent. This improves or even enables the early detection of damages that (also) influence the measurement signals of the component sensors.

Suitable threshold values for the evaluation of the determined indicator signals can for example be set based on empiric examinations with faulty components. The threshold values are thereby set preferably in a way that a specific time period, which corresponds to the time period that is required for planning and performance of a repair and/or a replacement of the component, prior to the probable failure of the components in question is exceeded or underscored. Repair and/or replacement can therefore be performed prior to the failure of the component and the lifespan of the component can at the same time be taken advantage of in an optimal way. In this context, the threshold values can in principle correspond to predetermined values in any way. For example, absolute values can be predetermined as threshold values for indicator signals. Likewise, the threshold values can be predetermined in relation to a value of an indicator signal at a specific point in time. Such a specification can for example comprise the setting of a specific difference to the value of the indicator signal at the predetermined time. This value can for example correspond to the value that the indicator signal in question has in case of a completely intact component. Such a value can be determined for example immediately after repair or replacement of the component.

Several exemplary variants of the embodiment of the monitoring device 10 explained before will be explained in the following with reference to (in principle any) component temperature signal, wherein it is assumed further that the stress signal indicates the power created by the generator. This signal will also be referred to as power signal in the following.

In one variant, the values of the temperature signal to be evaluated are categorized based on power classes, and respectively one parameter data set for further evaluation is created out of the temperature values of the individual power classes. This occurs preferably by using the adjusted temperature signal. Hence, each of the parameter data sets is created out of the values of the adjusted temperature signal that are part of a power class. The power classes correspond to predetermined power intervals of the power created by the generator 5 and cover preferably the entire power range of the wind turbine 1. In particular, this power range can be divided into equidistant intervals of a predetermined quantity that are used as power classes. The interval size can thereby be for example between 100 and 200 kW and in particular amount to 150 kW. To generate the parameter data sets, the monitoring device 10 respectively creates mean values of the adjusted temperature values of a power class for successive time intervals of a predetermined duration. The duration can be for example between one week and several months, in particular one month. Each generated parameter signal is therefore composed of the mean values of the adjusted temperature values of a power class.

Figure 2:
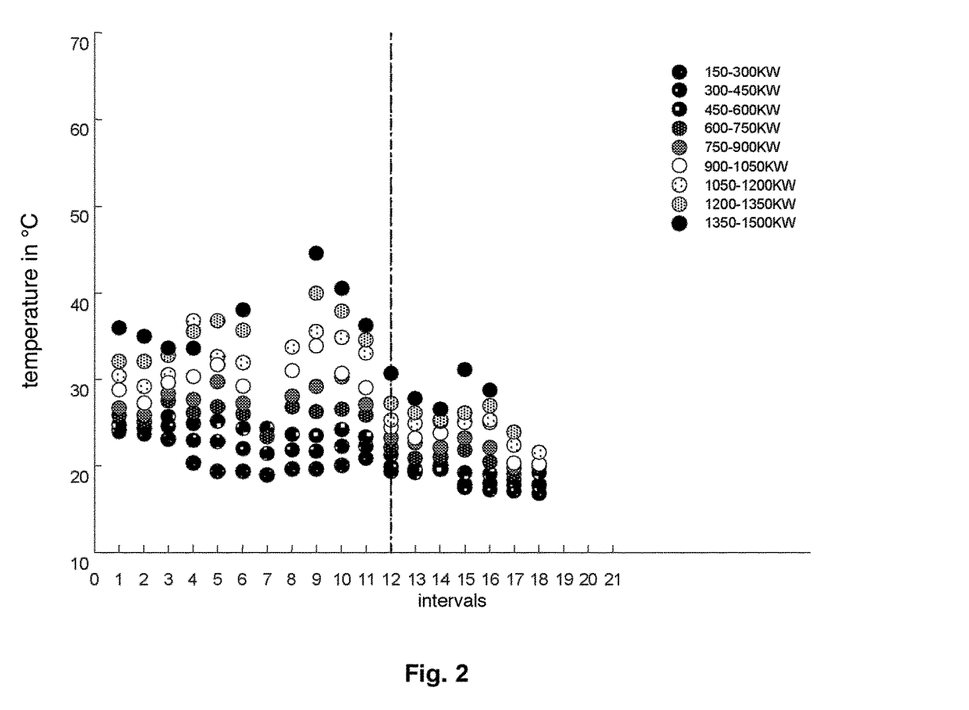
FIG. 2 an exemplary diagram with an indication of temperature mean values in different power classes for a generator bearing of a wind turbine, FIG. 3 an exemplary diagram for the illustration of quantiles of the temperature of a main bearing of a wind turbine, FIG. 4 an exemplary diagram for the illustration of temperature differences during transition between two power classes for a generator bearing of a wind turbine, FIG. 5a an exemplary diagram that shows sections of a power signal for a wind turbine with a similar course, FIG. 5b an exemplary diagram that shows temperature signals for a main bearing of the wind turbine that are associated to sections of the power signal, FIG. 6 an exemplary diagram that shows a temperature signal for the gearbox lubricant of the gearbox of a wind turbine and an associated trend curve, and FIG. 7 an exemplary diagram that shows an amplitude density spectrum for the temperature of a main bearing of a wind turbine.

The further evaluation of the parameter data sets in the monitoring device 10 is based on the observation that, in case of a faulty component, the spread of the values assigned to one another of the different parameter data sets is larger than in case of an intact component and that the parameter data sets of higher power classes have higher values in case of a faulty component. In FIG. 2, this is illustrated exemplarily and schematically for the generator bearing of a wind turbine 1. The Figure shows a diagram with the determined parameter data sets of different power classes as a function of the time intervals, wherein the faulty generator bearing, which was replaced by a new generator bearing in the time interval 12, was used in the wind turbine up to the time interval no. 12. The Figure clearly illustrates the larger spread between the parameter data sets and the higher values of the parameter data sets of the higher power classes prior to the time interval no. 12, i.e. prior to the bearing replacement.

In this variant, the monitoring device therefore detects a damage indication when the spread of values of the different parameters that are associated to one another exceeds a predetermined extent and/or when the values of one or multiple parameter data sets exceed respectively one threshold value in predetermined higher power classes, each of which forms a discreet indicator signal in this implementation. The spread of the values of the parameter data sets can be parameterized based on a suitable indicator such as the variance or standard deviation. The successive values of the indicator for the individual time intervals on the basis of which the mean values are formed thereby form the discreet indicator signal that will then be compared to a predetermined threshold value in the monitoring device. If one or multiple of the aforementioned indicator signals exceed(s) the associated threshold value once or multiple times, the monitoring device 10 detects a damage indication for the component.

In addition, it was found that also the adjusted temperature values have a larger spread within higher power classes in a faulty component. In a further variant, the monitoring device consequently determines a parameter data set that contains the adjusted temperature values for a predetermined power class. Likewise, also multiple parameter data sets can be determined respectively for a predetermined power class. As an indicator signal for each of the parameter data sets, the monitoring device determines in an implementation a discreet signal whose values quantify the spread of the temperatures contained in the parameter data set in successive time intervals of a predetermined length. The predetermined duration, in turn, can be between one week and several months and be in particular one month. This indicator signal is compared to a threshold value in the way described before and the monitoring device 10 detects a damage indication when the indicator signal exceeds the threshold value once or multiple times.

Figure 3:
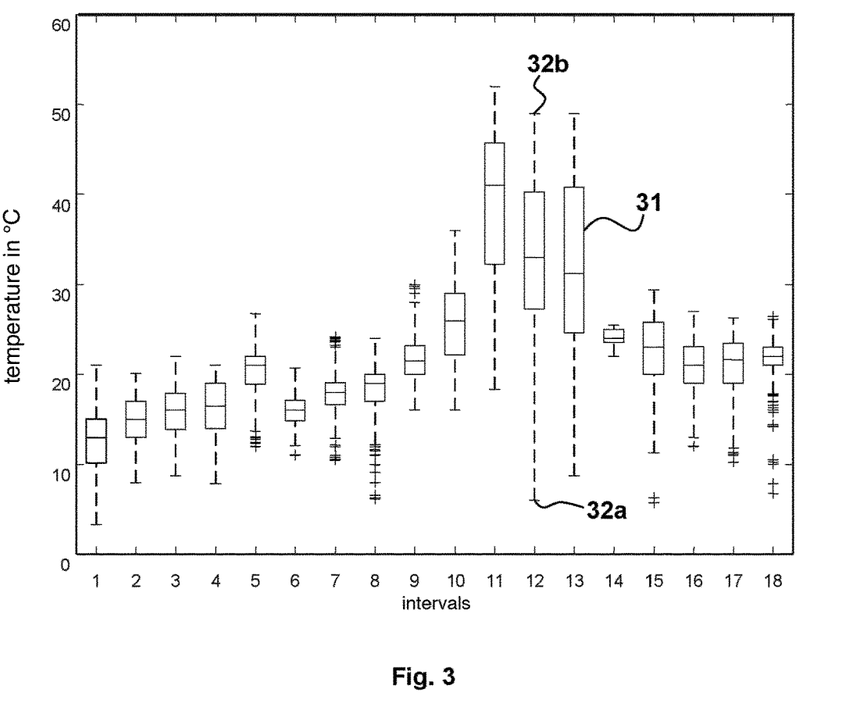

To determine the indicator signal, the monitoring device 10 can in particular calculate quantiles of the temperature values for the time intervals mentioned before, wherein a pquantile corresponds to the value that is underscored by the portion p of all values and that is exceeded respectively by the portion 1−p of all values. The indicator signal can for example comprise the difference between the 75% quantile and the 25% quantile for each time interval, which is also referred to as interquartile range and which is a measure for the spread of the temperature values. In addition or alternatively, a lower whisker and an upper whisker, which correspond to limit values outside of the interquartile range, can be determined. The whiskers can be defined in different ways. In an embodiment, the whiskers can for example be calculated in a way that the adjusted temperature values are between the whiskers with a confidence interval of 95%. The difference between the whiskers is also a measure for the spread of the adjusted temperature values so that an indicator signal can be formed out of the difference values of the whiskers for the successive time intervals.

To illustrate this variant, FIG. 3 displays quantiles and whiskers of the adjusted temperature values for multiple time intervals in an exemplary way, wherein a faulty main bearing, which was replaced by a new main bearing in the time interval no. 14, was used prior to the time interval no. 14. For each time interval, the diagram in FIG. 3 shows a box that is delimited at the bottom by the 25% quantile and at the top by the 75% quantile (a box is denominated exemplarily with the reference sign 31). In addition, the diagram shows the upper and the lower whisker for each time interval (for one interval, the lower whisker is denominated exemplarily with the reference sign 32a and the upper whisker with the reference sign 32b). The large spread and the big difference between the quantiles as well as the whiskers prior to the exchange of the bearing can be seen clearly.

In a further implementation, an indicator can be formed in addition or alternatively out of the variances or standard deviations of the adjusted temperature within the individual time intervals. These quantities also constitute a measure for the spread of the adjusted temperature values and can therefore be used for the creation of an indicator signal.

In addition, it was found that the adjusted temperature values are distributed within the power classes in case of intact components essentially according to a normal distribution. In case of a damage, however, the distribution of the temperature values can be approximated less well or no longer by a normal distribution. As a further indicator signal for the adjusted temperature values within a power class, the monitoring device can therefore determine a quantity that quantifies the deviation of the distribution of the temperature values from a normal distribution (wherein this indicator signal has only one value). An example for such a quantity is the test variable $\chi^2$ that can be determined based on the chi-square test that is in principle known to specialists.

In a further variant, the monitoring device 10 determines power increases in which the power created by the generator jumps from one power class to the next higher power class. For each determined power increase, the monitoring device determines the associated temperature difference. Said temperature difference corresponds to the difference between the temperature values that are associated to the power values in the lower and the next higher power class. The temperature differences, which are determined for successive power increases to a specific power class, form a parameter data set in this variant that is further evaluated in the monitoring device 10 to determine the status of the component in question of the wind turbine. In this context, the monitoring device 10 can form such a parameter data set for a specific target power class or it can form respectively one parameter data set of this type for several target power classes. In the latter case, the further evaluation takes place separately for each parameter data set.

The further evaluation is based on the observation that the temperature differences explained before are larger over a specific number of power increases in case of a faulty component than in case of an intact component. This is illustrated in an exemplary way for the generator bearing of a wind turbine in FIG. 4. Said Figure shows a diagram in which the temperature differences are displayed for a number of power increases, while a faulty generator bearing, which was then replaced, is at first used in the wind turbine during these power increases. The replacement is indicated by the line 41 in the diagram. The larger temperature differences prior to the exchange of the generator bearing can be clearly seen in this diagram.

Figure 4:
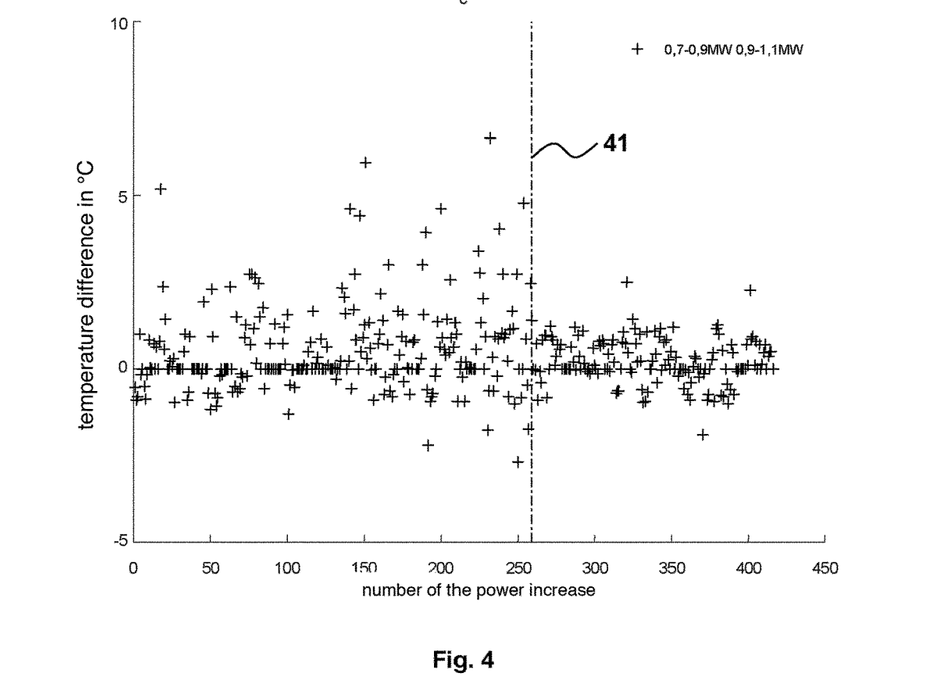

With this in mind, the monitoring device 10 can use the successive values of the temperature difference in the parameter data set in question as an indicator signal for each determined parameter data set. For each determined parameter data set, the associated indicator signal is compared as described to a threshold value in order to determine the status of the component to which the evaluated component temperature signal relates.

In a further variant of the monitoring device 10, parameter data sets are formed respectively out of the adjusted temperature values that are associated to courses of the power signal over a predetermined period that are similar to one another. The period can be for example between a few hours and several days. In contrast to determining the parameter data sets on the basis of power classes, this method has the advantage that the history of the stress of the wind turbine is taken into account. To this extent, it was observed that the adjusted temperature values recorded respectively by the component temperature sensors are not equal in a specific power class at all times when the wind turbine 1 runs in this power class. This seems to be due to the condition that the heat flows within the wind turbine are relatively inert because of the high masses of the components. Therefore, also the temporal course of the stress and/or of the power generated by the generator 5 has an influence on the recorded adjusted temperature values besides the amount of the stress and/or of the power value. This is taken into account through the determination of courses of the power signal that are similar to one another.

To determine similar temporal courses of the power signal, the monitoring device selects at first a section of the power signal over the predetermined time period. Then, the monitoring device 10 searches the overall power signal for sections with a similar course of the power signal. This can occur through an evaluation of the power signal within a moving window that is displaced successively over the whole power signal. If the monitoring device 10 determines a section of the power signal with a course that is similar to the course of the previously selected section of the power signal, the associated adjusted temperature values will be saved in the temperature data set together with the adjusted temperature values that are associated to the previously selected section. This way, a parameter data set is created for the previously selected section of the power signal. In the same way, parameter data sets can in addition be formed for other sections of the power signal that are chosen appropriately from the power signal.

The verification whether two sections of the power signal are similar to one another is performed by the monitoring device based on a suitable measure of similarity. In this context, any measure of similarity that is known to specialists can be used in principle. An example for a measure of similarity, which can be used here in the monitoring device 10, is the mean squared deviation between two sections of the power signal. It is calculated by $$E_2 \sqrt{\frac{1}{N} \sum_{k=1}^{N} (l_{1,k} - l_{2,k})^2},$$

wherein $E_2$ is the deviation between the signals, N the number of the measurement values within the signal sections and $l_{i,k}$, the k-th measurement values of the signal section i (k=1, . . . , N; i=1, 2). A similarity between two signal sections is identified by the monitoring device 10 when the measure of similarity is smaller than a predetermined threshold value.

Figure 5A:
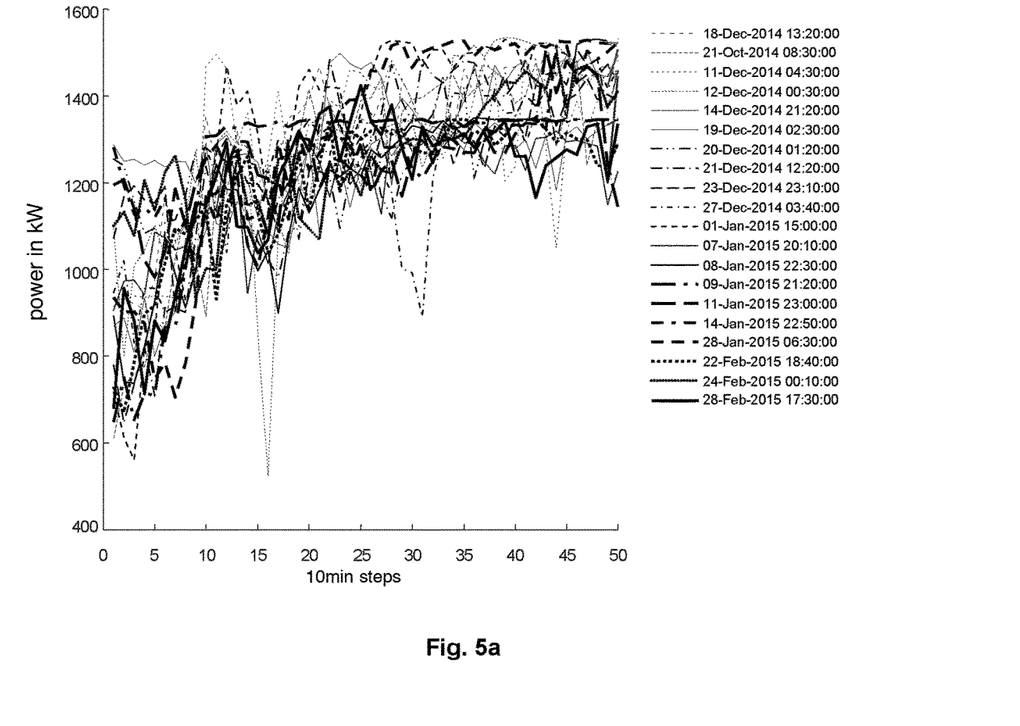
Figure 5B:
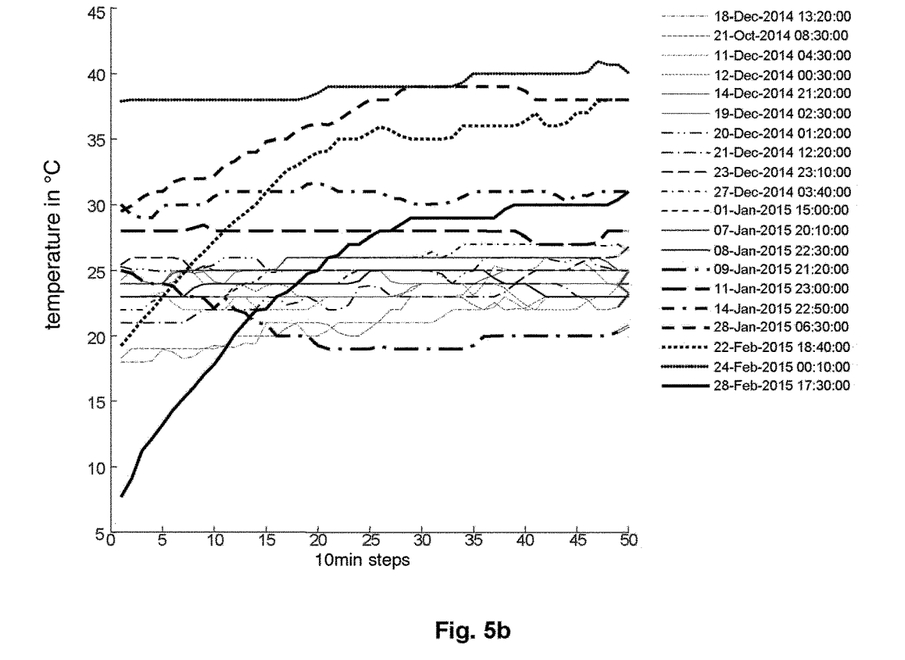

The evaluation of the parameter data sets determined in this variant is performed on the basis of the observation that, in case of a damaged component, the adjusted temperature level for one section of the power signal is higher and that the temperature values increase more strongly with the power. This is illustrated exemplarily in the FIGS. 5a and 5b for the main bearing of a wind turbine 1. FIG. 5b illustrates the temperature courses, which are associated to sections of the power signal that are similar to one another and that were recorded within different time periods that comprised respectively 50 temperature values (10-minute mean values). The points in time of the beginning of these time periods are also indicated in the Figure. FIG. 5a shows the associated sections of the power signal. The examined main bearing was replaced due to a bearing failure in April 2015 and the displayed temperature values were recorded by means of the temperature sensor 12 within a period with the duration of several months prior to replacement. FIG. 5b therefore displays the higher temperature level and the stronger increase of the temperature in the temperature courses that have been recorded approximately from January 2015 onwards. On this basis, the damage of the main bearing can be already be detected several months prior to the failure of the bearing.

To identify a faulty component, the monitoring device 10 therefore determines in an implementation the mean temperature for each of the temperature courses that are contained in a parameter data set and that are associated to a section of the power signal. Based on the mean temperatures for temperature courses that have been recorded temporally successively, the monitoring device then forms an indicator signal that is compared to a threshold value in the way described above. The monitoring device 10 will detect a damage indication for the component if the indicator signal exceeds the threshold value. Likewise, the indicator signal can also be formed directly (without mean value formation) based on the temperature values of a parameter data set. In addition or alternatively, the monitoring device 10 can determine a quantity, which quantifies the change of the temperature within the course, for each temperature course within a parameter data set, which is associated to a section of the power section, and form an indicator signal out of the values of this quantity. This can take place in particular in cases where the power increases or decreases significantly towards the end of the respective section in relation to the power at the start of the section (as in case of FIG. 5b). Examples for quantities of this type are the mean gradient of the temperature course or the maximum of the mean gradient that are available in sections of the temperature course with a predetermined length, wherein the length can be chosen in a way that the typical fluctuations of the temperature course for an intact component are not taken into account. If the latter example is used, the monitoring device can for example form the mean gradient for sections of the temperature course over a duration of several hours (in particular between 3 and 5 hours) and determine the maximum of this gradient for each temperature course. The respective indicator signal for the parameter data set can in this case be formed out of the maximum values that have been determined for the individual temperature courses included in the parameter data set.

It was found in addition that measurement signals such as in particular temperature signals increase starting from a type-specific base level in case of damage of a component. Such an increase was determined for example for the temperature of the gearbox lubricant in the lubricant sump of the gearbox 8 in case of a faulty cooling system. In this process, the temperature of the gearbox lubricant increased in case of gearboxes 8 of different types and from different manufacturers starting from different base levels.

To identify such damages based on a threshold value of the temperature signal, different threshold values would have to be determined for different gearbox values. To avoid said damages, a further embodiment provides that the monitoring device 10 identifies the trend progression of a—where required—adjusted temperature signal in a predetermined power range and determines its gradient. The power range can correspond to one or multiple of the aforementioned power classes or be predetermined in a different way. By limiting the evaluation to the predetermined power range, short-term maximum and minimum values of the temperature signal, which arise due to short-term power peaks and slumps, can be masked.

Figure 6:
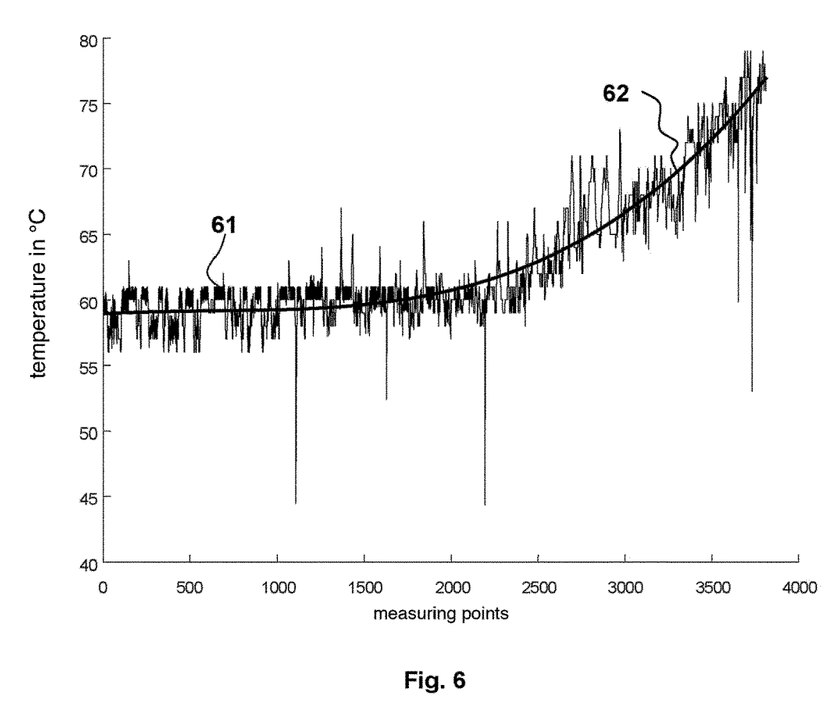

A trend progression of the temperature signal is in particular understood as its rough course without taking into account minor fluctuations (local maximum and minimum values). To determine the trend progression, the adjusted temperature measurement values can—where required—be approximated for example by a function of a predetermined type. In particular, the approximation can be achieved by a polynomial of a specific degree, for example degree 3. To calculate the function, the monitoring device 10 can apply an appropriate method for curve fitting that is known to specialists. For illustrative purposes, FIG. 6 shows in an exemplary way a diagram with a temperature signal 61 that plots measurement data of the temperature of the gearbox lubricant of a wind turbine 1 to a specific power range of the wind turbine and a trend progression 62 that has been determined through approximation of the temperature measurement data by a thirddegree polynomial.

The gradient of the trend progression corresponds to the gradient of the determined function and constitutes in this embodiment an indicator signal for determining the status of a component of the wind turbine. To determine the status of the component to which the temperature signal determined this way relates, the monitoring device 10 compares the gradient signal to a predetermined threshold value. If the predetermined gradient exceeds the threshold value, the monitoring device 10 detects a damage indication that is used for a status determination in the way described before.

In further embodiments of the monitoring device 10, parameter data sets are not formed as a function of the stress signal. Instead, the monitoring device performs a spectral analysis of the measurement values of a component sensor for the formation of parameter data sets. In this process, the measurement signal of the component sensor is divided into spectral portions that correspond respectively to a specific frequency and/or period, wherein the associated amplitude is determined for each spectral portion. The detection of faulty components is based in this embodiment on the observation that in case of a faulty component higher amplitudes occur for certain frequencies than in case of an intact component.

To determine the increase and/or the higher value of these amplitudes, the monitoring device identifies the spectral portions of the measurement signal of the component sensor respectively for different periods that start at successive points in time and that have preferably the same duration. The different periods can thereby overlap. In this case, the spectral analysis can in particular be performed based on a so-called moving window. Furthermore, the amplitudes of all or individual predetermined frequencies and/or periods are determined for each of the periods and a parameter data set is formed out of these amplitudes. In addition, the monitoring device 10 forms an indicator signal for each relevant amplitude that indicates the temporal course of the amplitude in question. Hence, the indicator signal is composed in a chronological order of the amplitude values that are determined for the different periods. Alternatively, the indicator signal can also contain the squared amplitude values (this corresponds to the so-called power density spectrum). The determined indicator signals are compared to threshold values, which are predetermined in the way described before, by the monitoring device 10. If an indicator signal exceeds the assigned threshold value, the monitoring device 10 will detect a damage indication for the component to which the evaluated measurement signal relates.

The monitoring device 10 can perform the spectral analysis of the measurement signal of a component sensor based on the Fourier transformation that is in principle known to specialists, in particular using an FFT (Fast Fourier Transform) algorithm. In case a Fourier transformation is used, said transformation is implemented separately for each of the different time periods mentioned before. In a further implementation, the spectral analysis can be implemented based on a wavelet transformation that is in principle known to specialists as well. Through the use of suitable wavelets, the measurement signal can in this transformation be transformed to the time and frequency domain without performing separate transformations for different time periods. Therefore, the spectral analysis to be performed is simplified by the wavelet transformation.

Figure 7:
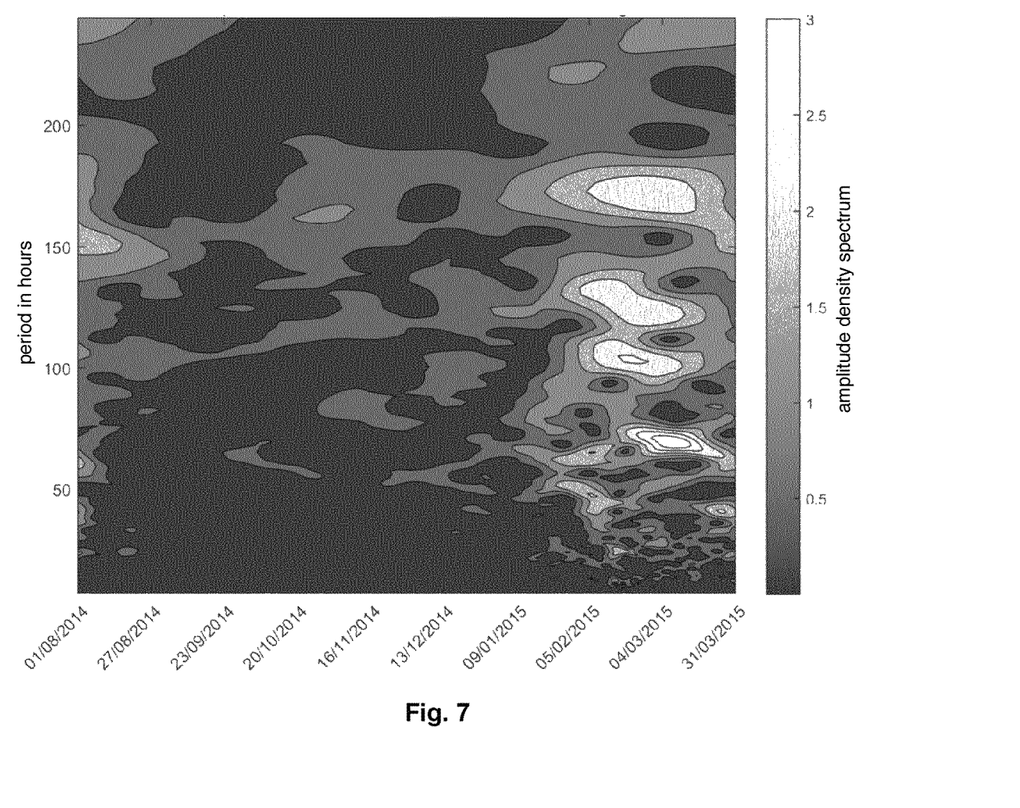

The evaluation based on the spectral analysis can be performed in particular for the (adjusted or unadjusted) measurement signals of the component temperature sensors of the wind turbine 1 explained before. For the temperature signals, increases of the amplitude have been observed for specific frequencies that indicate damages of the components in question. For illustrative purposes, FIG. 7 shows an exemplary display of an amplitude density spectrum of a temperature signal in a diagram that has been determined for the main bearing of the wind turbine 1 by means of wavelet transformation. The diagram indicates the amplitude values as a function of the period length and the time for a period from August 2014 until the end of March 2015. In April 2015, the main bearing was replaced due to a damage. This damage is indicated in the amplitude thickness spectrum by the increase of the amplitudes for specific period lengths, in particular for period lengths of approximately 70, 100, 125 and 175 hours. These period lengths are presumably related to typical wind fluctuations over several days and the associated stress variations that lead to temperature fluctuations in the components of the wind turbine. These fluctuations are apparently more pronounced in faulty components.

In the embodiments of the invention explained before, which can also be combined with one another, faulty components of a wind turbine 1 can be detected at an early stage. In this context, specialists find that it is also possible in a similar way to evaluate further and/or other measurement data of a wind turbine in order to detect faulty components, and that measurement data of other mechanical plants can be evaluated in a similar way to identify damages of components of said plants. In particular, specialists transfer the explained embodiments to other mechanical plants with rotating elements and bearings that are provided for the support of said elements. In addition, faulty components of other mechanical plants can also be detected in a similar way.

Some further measurement data of a wind turbine 1 and/or other mechanical plants, which can be evaluated in a similar way for the detection of damages, will be mentioned as examples (and by no means in an exhaustive way) in the following: in particular, flow volumes of fluids such as lubricants, cooling agents, gases or the like can be evaluated in order to detect narrowed ducts of said fluids and/or faulty valves. Furthermore, angular momentums and/or speeds can be evaluated. For wind turbines and other mechanical plants with generators, the evaluation can for example take place with regard to the generator capacity in order to identify faulty components of the generator and/or of its control. A further example comprises the evaluation of a number of particles in an oil flow or in another medium, for example to detect bearing damages at an early stage (in particular earlier than in case of the conventional oil analysis). Besides, the measurement values of position sensors and/or positions of different components of a mechanical plant can be recorded and evaluated, for example to detect damages that are connected to a faulty position of the components. In case of wind turbines, this also comprises the evaluation of the pitch of the rotor blades. Furthermore, this comprises the evaluation of measurement data of sensors that detect the displacements of components out of a target position. The measurement data, which indicate deformations of components of mechanical plants can be evaluated in a similar way. An evaluation of such measurement data can also and in particular be used to detect loosening effects at an early stage. In addition, electric operating variables such as resistances, current strengths, capacitances and voltages as well as their frequencies can be evaluated with regard to electric components of a mechanical plant to detect damages on said components. In particular, electric operating quantities such as currents can be recorded and evaluated for engines of mechanical plants. Further, accelerations can be determined to the extent to which they are not representative for vibrations of rotating components or their bearings. Hence, for example oscillations of the tower 3 of a wind turbine can be recorded and evaluated based on acceleration measurements in order to detect damages of components of a wind turbine. Further examples include the measurement and evaluation of velocities of components of mechanical plants such as the velocity of conveyor belts or other conveyor systems.

In this context, the measurement data explained above shall be understood in a purely exemplary and non-exhaustive way as stated before.

The invention claimed is:

1. A method for monitoring a status of at least one component of a wind turbine, comprising:
   receiving an evaluation signal that is formed based on values of a measurement quantity recorded by a sensor in the wind turbine;
   determining at least one parameter data set based on at least one of the evaluation signal as a function of a signal that is representative for a stress of the wind turbine or a spectral analysis of the evaluation signal;
   determining a spread of the at least one parameter data set; and
   determining the status of the component of the wind turbine as a function of the spread, wherein the status determination is performed independently of the vibration frequencies of at least one of a rotating component of the wind turbine or bearings of the component of the wind turbine that are induced by damage.

2. The method according to claim 1, wherein the at least one parameter data set is determined as a function of values of the evaluation signal that are selected based on the evaluation signal as a function of the signal that is representative for the stress of the wind turbine.

3. The method according to claim 1, wherein the at least one parameter data set includes values that are selected based on the evaluation signal as a function of the signal that is representative for the stress of the wind turbine.

4. The method according to claim 1, wherein one or multiple parameter data sets are formed, which respectively include temporal mean values of values of the evaluation signal that are determined in connection with values of the signal, which is representative for the stress of the wind turbine, within a predetermined interval of values.

5. The method according to claim 4, wherein the spread is between temporal mean values of different parameter data sets and/or for the temporal mean values of a parameter data set.

6. The method according to claim 1, wherein at least one parameter data set is formed, which includes values of the evaluation signal that are determined within a predetermined interval of values in connection with values of the signal that is representative for the stress of the wind turbine, and wherein the spread is of the values included in the parameter data set in successive time intervals.

7. The method according to claim 1, wherein at least one parameter data set is formed that includes differences between values of the evaluation signal that are determined in connection with a transition of the signal, which is representative of the stress of the wind turbine, from a first into a second interval of values, and wherein the spread indicates the values of the differences.

8. The method according to claim 1, wherein at least one parameter data set is formed that includes values of the evaluation signal that are determined in connection with temporal sections of the signal, which is representative for the stress of the wind turbine, in which the courses of said signal are similar to one another.

9. The method according to claim 8, wherein the spread is representative within temporal sections of the evaluation signal that correspond to the temporal sections of the signal that is representative of the stress of the wind turbine in which the courses of this signal are similar to one another.

10. The method according to claim 1, wherein amplitudes for spectral portions with regard to most temporal sections of the evaluation signal are determined based on spectral analysis and wherein at least one parameter data set is formed based on the determined amplitudes.

11. The method according to claim 10, wherein the spread includes values of amplitudes of a spectral portion with regard to most temporal sections.

12. The method according to claim 1, wherein an indicator of a damage of a component is identified when the spread reaches a predetermined threshold value.

13. The method according to claim 1, wherein the measurement quantity is a temperature or wherein the signal that is representative of the stress of the wind turbine indicates a power generated by the wind turbine.

14. A non-transitory computer readable medium storing a computer program comprising a program code that prompts a computer system to perform an operation of monitoring of a status of at least one component of a wind turbine when the computer program is run on the computer system, the operation comprising:
   receiving an evaluation signal that is formed based on values of a measurement quantity recorded by a sensor in the wind turbine;
   determining at least one parameter data set based on at least one of the evaluation signal as a function of a signal that is representative for a stress of the wind turbine or based on a spectral analysis of the evaluation signal;
   determining a spread of the at least one parameter data set; and
   determining the status of the component of the wind turbine as a function of the spread, wherein the status determination is performed independently of the vibration frequencies of at least one of a rotating component of the wind turbine or bearings of the component of the wind turbine that are induced by damage.

15. A monitoring device for monitoring a status of at least one component of a wind turbine, wherein the monitoring device is configured to, at least:
   receive an evaluation signal that is formed based on values of a measurement quantity that is recorded by a sensor in the wind turbine,
   determine at least one parameter data set based on at least one of the evaluation signal as a function of a signal that is representative for the stress of the wind turbine or based on a spectral analysis of the evaluation signal,
   identify a spread of the at least one parameter data set, and
   determine the status of the component of the wind turbine as a function of the spread, wherein the status determination is performed independently of vibration frequencies of at least one of a rotating component of the wind turbine or bearings of the component of the wind turbine induced by damage.

16. The non-transitory computer readable medium according to claim 14, wherein the at least one parameter data set is determined as a function of values of the evaluation signal that are selected based on the evaluation signal as a function of the signal that is representative for the stress of the wind turbine.

17. The non-transitory computer readable medium according to claim 14, wherein the at least one parameter data set includes values that are selected based on the evaluation signal as a function of the signal that is representative for the stress of the wind turbine.

18. The non-transitory computer readable medium according to claim 14, wherein one or multiple parameter data sets are formed, which respectively include temporal mean values of values of the evaluation signal that are determined in connection with values of the signal, which is representative for the stress of the wind turbine, within a predetermined interval of values.

19. The non-transitory computer readable medium according to claim 18, wherein the spread is representative of a spread between temporal mean values of different parameter data sets and/or for the temporal mean values of a parameter data set.

20. The monitoring device of claim 15, wherein the at least one parameter data set is determined as a function of values of the evaluation signal that are selected based on the evaluation signal as a function of the signal that is representative for the stress of the wind turbine.

\* \* \* \* \*